US008315991B2

(12) United States Patent
Mandagere et al.

(10) Patent No.: US 8,315,991 B2
(45) Date of Patent: Nov. 20, 2012

(54) DETECTING INADVERTENT OR MALICIOUS DATA CORRUPTION IN STORAGE SUBSYSTEMS AND RECOVERING DATA

(75) Inventors: Nagapramod S. Mandagere, San Jose, CA (US); Mark J. Seaman, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/763,934

(22) Filed: Apr. 20, 2010

(65) Prior Publication Data

US 2011/0258164 A1      Oct. 20, 2011

(51) Int. Cl.
*G06F 17/30* (2006.01)
(52) U.S. Cl. .......... 707/690; 707/685; 711/161; 714/6.1
(58) Field of Classification Search ................ 714/1–37, 714/100
See application file for complete search history.

(56) References Cited

U.S. PATENT DOCUMENTS

| 5,905,990 | A * | 5/1999 | Inglett ................................. 1/1 |
| 6,341,341 | B1 * | 1/2002 | Grummon et al. ............ 711/162 |
| 6,732,124 | B1 * | 5/2004 | Koseki et al. ........................ 1/1 |
| 7,149,787 | B1 | 12/2006 | Mutalik |
| 7,356,658 | B2 * | 4/2008 | Satoyama et al. ............ 711/162 |
| 7,406,488 | B2 | 7/2008 | Stager |
| 7,426,617 | B2 | 9/2008 | Stager |
| 7,562,200 | B1 * | 7/2009 | Chatterjee et al. ............ 711/163 |
| 7,562,251 | B1 * | 7/2009 | Karr ............................ 714/6.23 |
| 7,613,750 | B2 * | 11/2009 | Valiyaparambil et al. ............ 1/1 |
| 7,849,257 | B1 * | 12/2010 | Kim ............................... 711/112 |
| 7,882,067 | B2 * | 2/2011 | Saika ............................. 707/639 |
| 2006/0173935 | A1 | 8/2006 | Merchant |
| 2007/0100905 | A1 | 5/2007 | Masters |
| 2007/0179994 | A1 | 8/2007 | Deguchi |
| 2007/0276884 | A1 | 11/2007 | Hara |

OTHER PUBLICATIONS

Distler, T, et al, "Efficient State Transfer for Hypervisor-Based Proactive Recovery", ACM Digital Library, Apr. 2008.
Meyer, D.T. et al, "Parallax: Virtual Disks for Virtual Machines", ACM Digital Library, EuroSys '08, pp. 41-54, Apr. 2008.
Ta-Shma, P. et al, "Virtual Machine Time Travel Using Continuous Data Protection and Checkpointing", pp. 127-134.
Weil, S.A. et al, "Ceph: A Scalable, High-Performance Distributed File System", USENIX '06, pp. 307-320.

* cited by examiner

*Primary Examiner* — Fred I Ehichioya
*Assistant Examiner* — Michelle Owyang
(74) *Attorney, Agent, or Firm* — Mohammed Kashef; Anne Vachon Dougherty (57) ABSTRACT

Embodiments of the invention detect inadvertent or malicious data corruption and for recovering data including receiving a query specifying corrupted application data; analyzing transaction logs to find update operations related to the data; determining where the data are stored, by mapping the table data to locations within the file system and mapping the file system locations to volume logical blocks; and analyzing snapshot volume bitmaps to determine if the bitmaps show changes to the table data stored in the volume logical blocks. Changes which are reflected in the bitmaps for the data, but which do not have corresponding entries in the transaction logs are flagged as unauthorized changes. Snapshots of the data, from a time prior to the time at which a flagged snapshot was taken, are identified for use in restoring data to its status prior to the unauthorized change.

18 Claims, 4 Drawing Sheets

DETECTING INADVERTENT OR MALICIOUS DATA CORRUPTION IN STORAGE SUBSYSTEMS AND RECOVERING DATA

BACKGROUND

The invention relates generally to data recovery in enterprise computer systems and more particularly to determining when a database object has changed, determining if the change was authorized or inadvertent, and identifying a non-corrupt point-in-time copy of data to recover.

Data corruption is an important problem for customers of enterprise computer systems. Causes for data corruption may include one or more of application software bugs, human configuration errors, and physical media errors caused by disks, caching, controller firmware bugs and/or multi-path drivers. Another category of errors are inadvertent writes to a device which may be the result of Storage Area Network (SAN) configuration errors, unintentional writes by a privileged user, silent disk errors, or damage caused by virus attacks and malicious worms. This category of errors will be referred to as "inadvertent writes" hereinafter.

Errors caused by software bugs, human configuration errors, and physical media errors (collectively referred to as "logical errors") can be detected and corrected by referring to the logs available at the application tier, the middleware tier, and the storage tier. However, the inadvertent writes cannot be detected and corrected in the same way using available logs. Storage subsystem hardware and storage management software have long provided the ability to make "Point-In-Time" copies of data managed by the systems. In order to recover from the logical errors at a production server using Point-in-Time copy techniques, stored volume copies must be accessed and the data as it existed before the error occurred must be used to restore the production system to a state as before the error.

The primary methods of creating a Point-in-Time copy are the Split Mirror method and the Copy-on-Write (COW) method. In the Split Mirror method, a traditional RAID-1 mirror is removed from the configuration of the production system and used for some other purpose. In the Copy-on-Write (COW) method, at the time the Point-in-Time copy is initiated, a bitmap is created to manage regions of the storage (sectors, tracks, or blocks, for example). If a region of the original volume is to be modified, the original contents of the region are first copied to the storage region allocated to the Point-in-Time copy. There are also variations of the Copy-on-Write technique that modify the original volume in order to reduce the number of I/O operations required to preserve the integrity of the Point-in-Time copy, such that only changed blocks are copied.

A primary purpose of the various Point-In-Time copy technologies is to provide a means to quickly recover from logical errors caused by software bugs or human error. One of the most common uses of Point-in-Time copies is to make backups of enterprise databases. The controller periodically takes a snapshot of the available volumes. At the time of data corruption, the database administrator needs to decide on the "optimal" stored snapshot to use for data recovery. Determining which snapshot is optimal is typically a trade-off between data loss (a Recovery Point Objective or "RPO") and the amount of time it takes to get the production system back on-line after a failure (a Recovery Time Objective or "RTO").

As noted above, errors caused by software bugs, human configuration errors, and physical media errors can be detected and corrected by referring to the logs available at the application, middleware, and storage tiers using any of the existing Point-in-Time copy techniques.

BRIEF SUMMARY

The present invention provides a method and computer program product for automatically detecting at least one inadvertent write to data to restore comprising steps of receiving a query specifying a corrupt application data set, said set comprising data information about at least one corrupt data object and time information temporally locating said corrupt data object; locating one or more bitmaps for snapshots for said at least one data object, said bitmaps having at least one bitmap entry; locating a transaction log for said data objects based on said time information, said transaction log having at least one transaction log entry; comparing at least one transaction log entry to said at least one bitmap entry for said one or more bitmaps; and detecting an inadvertent write when a change to a bitmap entry does not have a corresponding transaction log entry.

BRIEF DESCRIPTION OF THE SEVERAL VIEWS OF THE DRAWINGS

The invention will now be described with reference to the accompanying drawings in which.

DETAILED DESCRIPTION

Under the present invention, transaction log analysis, database (DB) catalog mapping, FS LBA mapping, and anomaly pattern detection are used to identify unauthorized changes to data and to locate a data snapshot from prior to the changes to be restored. More specifically, in response to input of a query specifying application data objects, in terms of tables, tablespaces, indexes, data files, etc., that have been corrupted, the inventive system and method analyze available transaction logs to find all update operations related to the data objects. In addition, the system and method determine where the data are stored by mapping the table data to locations within the file system and then mapping the file system locations to volume logical blocks. Snapshots of the logical volume blocks, in the form of snapshot volume bitmaps, are analyzed to determine if the bitmaps show changes to the table data stored in the volume logical blocks. Changes which are reflected in the bitmaps for the data, but which do not have corresponding entries in the transaction logs are flagged as likely to be unauthorized changes. Snapshots of the data, from a time prior to the time at which a flagged snapshot was taken, can then be identified for use in restoring data to its status prior to the unauthorized change.

Figure 1:
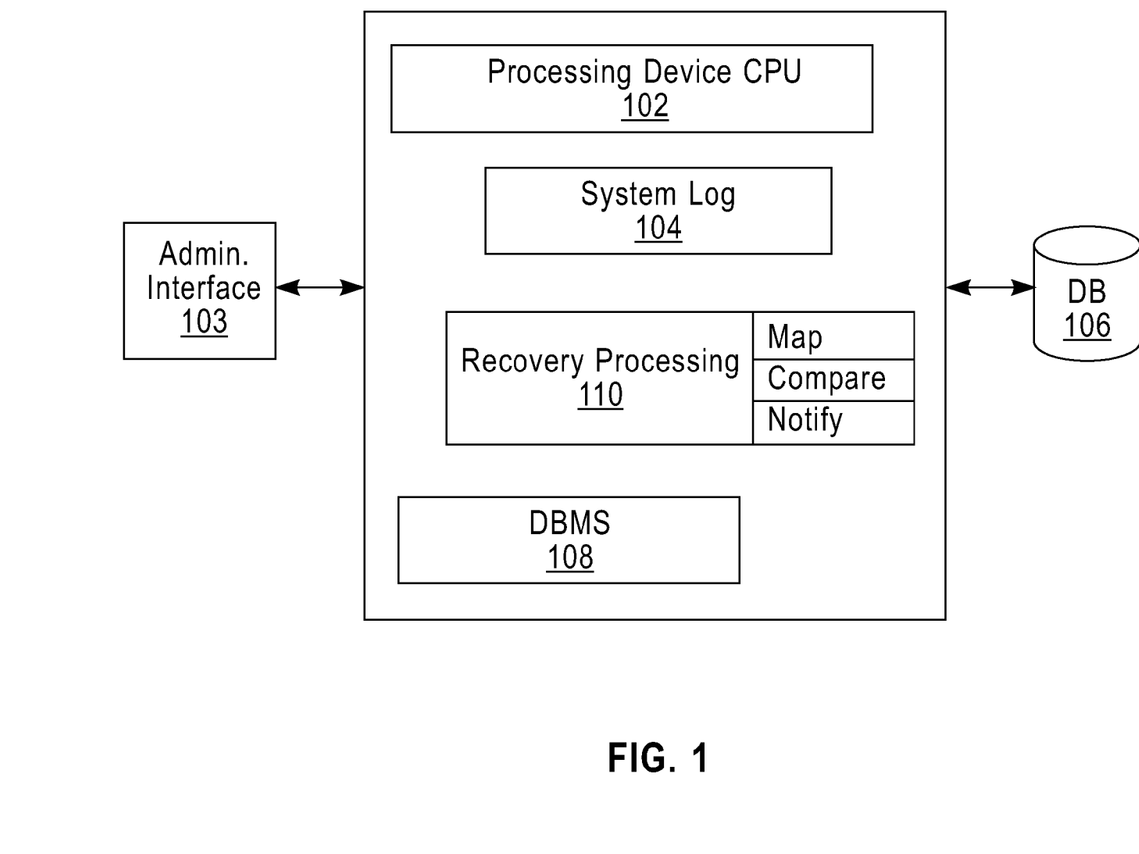
FIG. 1 illustrates a computer system for implementing the present invention.

FIG. 1 illustrates a computer environment, including a system administrator's interface 103 and processing system 101, for implementing the detecting of inadvertent write operations causing corruption in storage subsystems and the recovery of data. At least one processing device, shown as CPU 102, is provided to execute program components. Only those components germane to the present invention are illustrated in FIG. 1. A System Log Component 104 logs transactions as they occur and stores at least one transaction log in at least one storage location, shown as database 106. A Database Management System 108 manages the storage of objects in at least one storage location, also shown as database 106. The Database Management System includes a storage backup system for implementing a schedule for storing Point-in-Time copies as well as snapshots and volume bitmaps, as will be further detailed below. The system may additionally include a File System (FS), Volume Manager and Storage Controller performing known functionalities. A Recovery Processing System 110 is provided to access the at least one storage location in order to execute inadvertent write detection and data recovery of the present invention. The Recovery Process System includes a component for implementing the functionalities of mapping tables to storage locations and stored volume bitmaps, shown as Mapping component 112, a component for comparing bitmaps to transaction log entries, shown as Comparison component 114, and a component for notifying the system administrator of detected anomalies, shown as Notification component 116. It is to be noted that the components of the computer system need not be implemented exactly as illustrated, provided their attendant functionality is realized.

Figure 2:
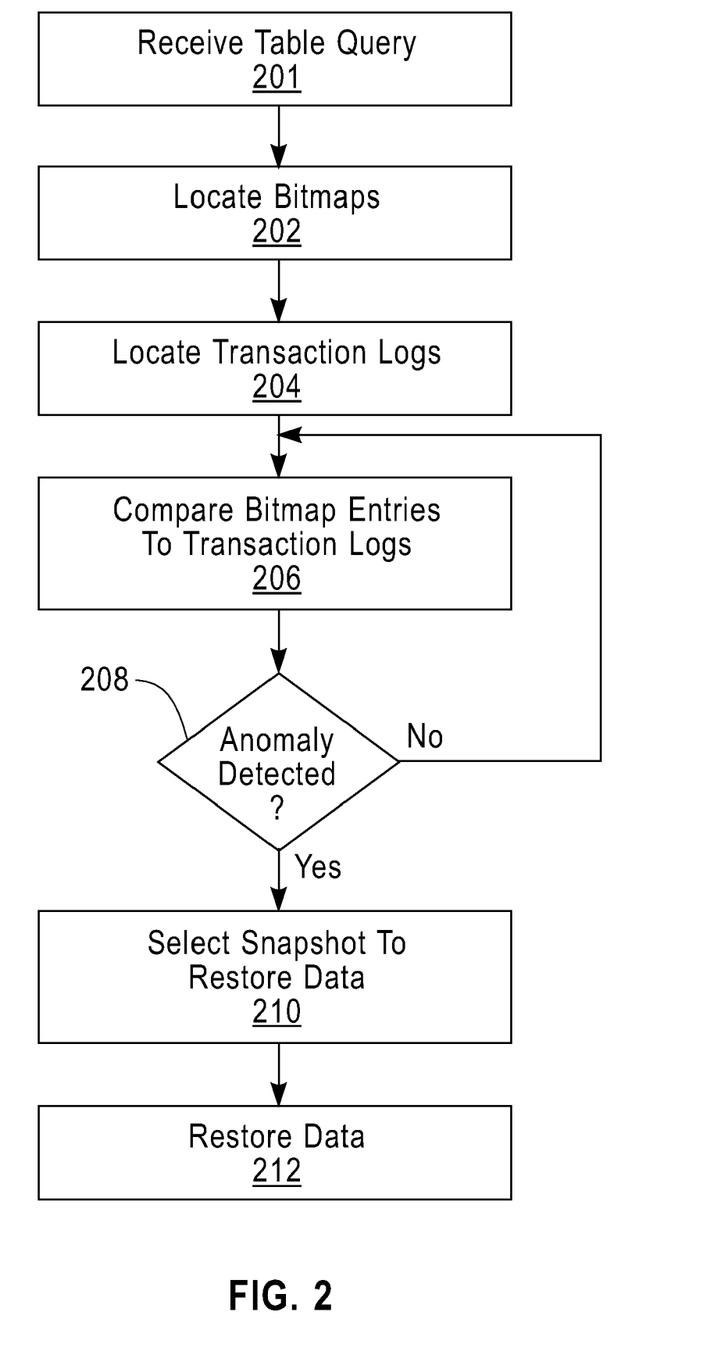
FIG. 2 is a representative process flow for implementing the present invention.

FIG. 2 illustrates a representative process flow for implementing the present invention. At step 201, query input is received from the system administrator. The query input comprise at least the identification of the data objects to be restored and one of the following parameters: the date/time (timestamp) at which the error occurred, the last known time at which the data object was correct, or a range of date/times when the error may have occurred. The identification of the object or objects to be restored will be provided as table or tablespace input for data known to have been corrupted. In response to the query input, the Recovery Processing System (RPS) 110 performs steps 202 and 204, which may be performed in the illustrated order or substantially in parallel. For each Point-in-Time copy in the range identified in the query, the RPS determines the storage regions which comprise the object. As further detailed below, given the database and object name(s), the mapping from table to Logical Block Address (LBA) can be determined. At Step 202, the RPS locates the Copy-on-Write bitmaps for the table. The Copy-on-Write bitmaps, shown at 401, 403, 405 and 407 of FIG. 4, use bit changes from 0 to 1 to indicate modified regions of a source volume. The details of updating and locating bitmaps for the table are provided below with reference to FIGS. 3 and 4. For each storage region, the RPS determines if the region was modified during the time range by examining the bitmap for the snapshot. If any of the storage regions correspond to the regions occupied by the object(s) to restore, the copy is marked as a candidate for the source of the unauthorized change, to be compared to the corresponding transaction log.

At Step 204, the RPS locates the transaction logs for the table. At Step 206, the bitmaps are compared to the transaction logs. If a bitmap indicates a change to a table that is not reflected in the transaction log for that table, then the change to the table is presumed to be an unauthorized change (i.e., corruption of data) caused by the class of errors known as inadvertent writes. At Step 208, a determination is made as to whether an anomaly pattern has been detected, the anomaly pattern being an inconsistency between changes noted in the bitmap for the table and transaction log entries for the table. If no anomaly pattern is detected at step 208, the process continues to evaluate other bitmaps (i.e., previous or successive bitmaps) for the table and the corresponding transaction log information until an anomaly is detected. Once an anomaly is detected, a "yes" determination at decision box 208, the RPS selects, at step 210, a snapshot from a point-in-time prior to the change reflected in the anomalous bitmap for use in restoring the object. The database object is restored at step 212. As an alternative to the RPS selecting a snapshot, the RPS may notify the system administrator of detection of the anomaly and identify and display the best candidate snapshot to recover from the error to the system administrator. The system administrator may then provide input for restoring the object.

Figure 3:
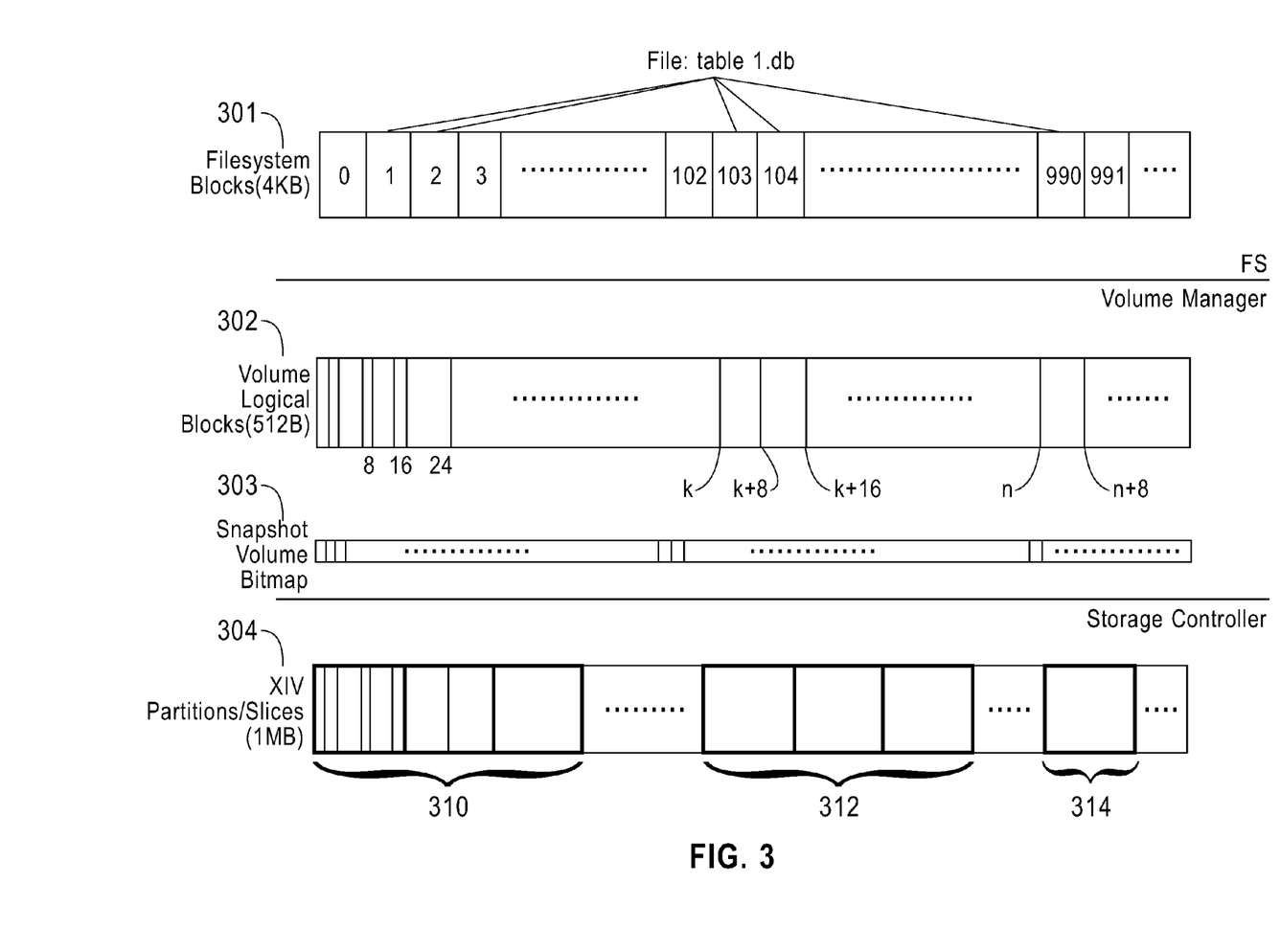
FIG. 3 illustrates mapping of table entries in accordance with the present invention.
Figure 4:
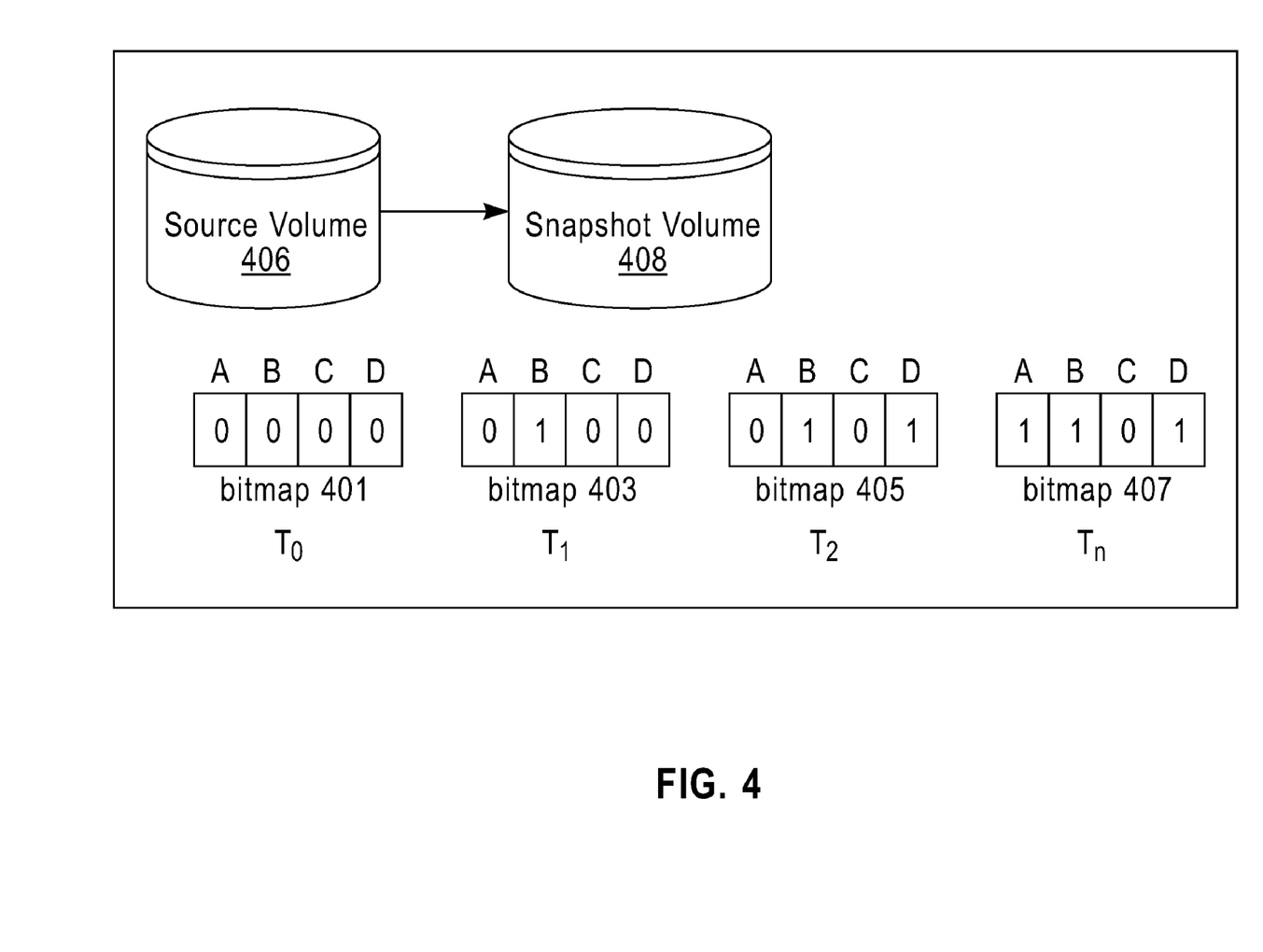
FIG. 4 illustrates changes to snapshots of volume bitmaps over time.

The mapping and use of bitmaps is hereinafter described in greater detail with reference to FIGS. 3 and 4. Applications, including Relational Database Management Systems (RDBMs), store data in "extents", "pages" or "blocks" on disk, wherein each disk contains multiple physical disk blocks. A particular database object will be stored at a specific offset on a storage device or file. The Database Management System (DBMS) maintains a list of pages used by each object, so that it may retrieve and update the object data. The page mapping information can be used to determine which storage regions are used by a particular object/table.

In most environments, the sizes of application pages and storage regions do not necessarily match. For example, the default block size for DB2 for Linux, UNIX and Windows is 32K, while the monitored storage region for XIV Nextra Storage Subsystem is 1 MB. For Oracle RDBMs, the default page size is 8K, while a monitored storage region for IBM FlashCopy is 32K. This may lead to some uncertainty regarding which block within a storage region was modified at a specific time. However, if a region occupied by a specific database object was not modified (i.e., the bitmap for this region indicates no change), then the "snapshot" is a candidate for recovering the object before modification.

Correlating database tables to files is a task made possible by various existing Database Application Programming Interfaces (DB APIs). Mapping a file to its corresponding logical blocks involves multiple steps due to multiple levels of mapping/indirection that exist in the stack. FIG. 3 shows a simplified overview of an example file: table1.db 301 being mapped to corresponding logical blocks of Volume Logical Blocks 302 from which a Snapshot Volume Bitmap 303 is made. Entries 1 and 2 are mapped to blocks from 8-24 bytes of the 512 bytes of the Volume Logical Blocks 302. Similarly, table entries 103 and 104 map to k through k+8 and k+8 through k+16, respectively, and entry 990 maps to the block n to n+8. Steps involved in this mapping process include mapping a file to corresponding File System (FS) blocks and mapping FS blocks to corresponding Volume Logical Block Addresses (LBAs). The Volume Logical Blocks are mapped to the partitions or slices 304 at the storage location.

Different File System-specific tools are typically used in the recovery domain to provide mechanisms for retrieving FS mapping information. Debugfs [ ] is one such commonly used utility on Linux systems. When executed on an ext3 file system, the command debugfs-c-R 'stat absolutePathName' dev/devName outputs the file system blocks for the specified file, where absolutePathName is the name of the file for which the mapping information is required and devName is the device name of a block disk device (e.g. /dev/sda, /dev/sdb, etc.).

As noted above, the mapping of file system blocks to volume logical blocks may or may not be a one-to-one mapping. For instance, a typical file system block size is 4K, whereas logical unit (LUN) block size, as configured in disk arrays, is typically anywhere between 512B and 512 KB. Storage controller level caching and other information lifecycle management (ILM) schemes are optimized for the LUN block size and hence the need for a level of indirection. In XIV Nextra storage system, the Volume/LUNs exported by XIV have a logical block size of 512B. In such systems, if FS block size is 4K, then FS block 0 on the file system would correspond to logical block addresses (LBAs) 0, 1, 2 . . . , 7.

As detailed above, snapshot volume bitmaps of volume logical blocks are periodically made and can be used to track changes to the underlying stored data. Reference numeral 303 of FIG. 3 illustrates a snapshot volume bitmap stored for the volume logical blocks shown at 302. A snapshot volume bitmap is typically a bit array with each bit representing some sort of status information about its corresponding logical block. As shown in FIG. 4, a set bit (i.e., a bit having a "1" value) in a location in the bit array indicates that the corresponding LBA has changed since the time of taking the snapshot. At creation of the source volume 406, the bitmap contains all 0s in its bitmap sections A through D as shown at 401. When a change is made to the source volume, a new snapshot is taken for storage at 408 and a new bitmap is generated and stored. Bitmap 403, taken at time T1 shows a bit change from 0 to 1 in the bitmap section B which corresponds to the modified region of the source volume. At time T2, bitmap 405 shows that additional changes have been made to another region D of the source volume. Finally, at time Tn, three 1s in bitmap 407 indicate changes to three of the four regions represented by the bitmap sections A, B and D.

Once the file-to-file system block mapping has been completed and the subsequent mapping of the FS block to the volume LBA has been done, the association between a file and a subset of bits in the snapshot volume bitmap can be inferred. Snapshot volume bitmaps for the table query input for the relevant time frame, such as bitmaps 401, 403, 405 and 407 for times T0 to Tn can be compared with the corresponding transaction logs for the table for the relevant time period to detect any anomaly patterns.

Most relational databases provide a mechanism for reading transaction log entries. For DB2, an Application Programming Interface (API) called db2ReadLog provides this function. It requires a starting and ending Log Sequence Number (LSN), which is a unique log record identifier representing the relative byte address of the log record within the database log. The db2ReadLog( ) API returns a Log Manager Header, shown in Table 1 below, and data for entry at the data manager, transaction manager, utility manager, and log data manager entries. For transaction manager log entries, each transaction is identified by a unique Transaction Identifier (TID). The log entry for a transaction also includes the time at which the transaction was committed. Corresponding Data Manipulation Language (DML) actions for this transaction will be chained together using the TID in the Log Manager header of each Data Manager Log record in the transaction. The Data Manager Log record contains both the table ID and the tablespace ID of the table affected by the DML action.

TABLE 1

Log Manager Log Record Header

| Description | Type | Offset (Bytes) |
| --- | --- | --- |
| Length of entire log record | Int | 0 (4) |
| Type of the log record | Short | 4 (2) |
| Log record general flag | Short | 6 (2) |
| Log Sequence Number of the previous log record written by this transaction. | Unsigned short | 26 (2) |
| Unique transaction identifier | SQLU_TID | 14 (6) |
| Log Sequence Number of the log record for this transaction prior to the log record being compensated. | SQLU_LSN | 20 (6) |

TABLE 1-continued

Log Manager Log Record Header

| Description | Type | Offset (Bytes) |
| --- | --- | --- |
| Log Sequence Number of the log record for this transaction being compensated. (Note: For propagatable compensation log records only.) | SQLU_LSN | 26 (6) |

Using the db2ReadLog API, an application can determine the time at which a table has been modified by examining the transaction manager log entries and any data manager log entries associated with the transaction. Using the commit date/time contained in the transaction manager log record, shown at Table 2 below, the application can determine the time(s) at which the object was modified (i.e., completed by a user) and the time at which the modification was written to disk. The application must also check that the transaction was not subsequently rolled back (identified by a Transaction Log Manager Abort Log Record, not shown) since that would mean that there was no net change to the table. Once this information is obtained for each table provided as an input parameter, snapshot timestamps can be examined to determine if the snapshot was taken before the transaction was committed. This would identify a potential source from which the system or system administrator could restore the table before it was maliciously or inadvertently modified.

TABLE 2

Normal Commit Transaction Manager Log Record

| Description | Type | Offset (Bytes) |
| --- | --- | --- |
| Log header | LogManagerLogRecordHeader | 0 (20) |
| Time transaction committed | sqluint64 | 20 (8) |
| Authorization identifier length | unsigned short | 28 (2) |
| Authorization identifier of the application[1] (if the log record is marked as propagatable) | char[ ] | 30 (variable) |

One operation that may not be logged is the bulk load of a table from a text file. There are parameters in the Load command that will cause the table load data to be logged. However, even though the actual data may not be logged in the Transaction Manager Log, a Utility Manager Log record entry, shown in Table 3, will be created to indicate the start of a table load. Although there is no date/time in the Utility Manager Log record for a table load, certainly some bounds on the start time can be established by examining the date/time of the transaction immediately preceding and following the table load log record to verify an authorized change.

TABLE 3

Load Start Log Record

| Description | Type | Offset (Bytes) |
| --- | --- | --- |
| Log header | LogManagerLogRecordHeader | 0 (20) |
| Log record identifier | sqluint32 | 20 (4) |
| Pool identifier | unsigned short | 24 (2) |
| Object identifier | Unsigned short | 26 (2) |
| Flag | sqluint32 | 28 (4) |
| Object pool list | variable | 32 (variable) |

The foregoing technique can be used to identify the point at which the storage region corresponding to a database table was modified without a corresponding transaction log entry. This would indicate an inadvertent write to the device or file by a privileged user. In each of these cases, the transgression can be detected and a snapshot suitable for recovery can be identified.

The methodologies of embodiments of the invention may be particularly well-suited for use in an electronic device or alternative system. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable medium (s) having computer readable program code embodied thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Program code stored on a computer readable medium may be transmitted using any appropriate medium, including but not limited to wireless, wire line, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 1 is a block diagram depicting an exemplary processing system 101 formed in accordance with an aspect of the invention. System 101 may include a processing device 102, memory 106 coupled to the processor (e.g., via a bus or alternative connection means), as well as input/output (I/O) circuitry operative to interface with the processor. The processor 102 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for automatically detecting at least one inadvertent write to data to restore comprising steps of:
   receiving a query specifying a corrupt application data set, said set comprising data information about at least one corrupt data object and time information temporally locating said corrupt data object;
   locating one or more bitmaps for snapshots for said at least one corrupt data object, said one or more bitmaps having at least one bitmap entry indicating whether data previously stored at a corresponding storage location has been modified;
   locating a transaction log for said at least one corrupt data object based on said time information, said transaction log having at least one transaction log entry;
   comparing at least one transaction log entry to said at least one bitmap entry for said one or more bitmaps; and
   detecting an inadvertent write when a change to a bitmap entry does not have a corresponding transaction log entry,
   wherein said detecting an inadvertent write comprises detecting a snapshot anomaly pattern, the snapshot anomaly pattern existing in a snapshot storage region when there is a probability of change to a database table and no update operation for the snapshot.

2. The method of claim 1 further comprising the step of identifying a non-corrupt snapshot created and stored before the detected inadvertent write.

3. The method of claim 2 further comprising using said non-corrupt snapshot of the data to restore the data.

4. The method of claim 1 wherein locating one or more bitmaps comprises steps of:
   identifying a file system location for said at least one corrupt data object based on query information;
   mapping the file system location to at least one volume logical block;
   locating at least one snapshot of said at least one volume logical block; and
   retrieving at least one snapshot volume bitmap for said at least one snapshot.

5. The method of claim 1 further comprising a step of receiving metadata for each snapshot.

6. The method of claim 5 further comprising a step of analyzing the metadata of each snapshot, wherein analyzing the metadata comprises discovering an update operation related to a database table and associated with a transaction and discovering a change to a subset of a plurality of blocks of the database table.

7. The method of claim 1 further comprising identifying a non-corrupt snapshot of the data, wherein the non-corrupt snapshot of the data exists if the snapshot storage region corresponds to a region occupied by a database object to restore.

8. The method of claim 5, wherein the metadata contains information from at least one of:
   a volume bitmap, wherein the volume bitmap is created to manage regions of storage when a point-in-time copy of data is initiated;
   application entry mapping information, the application entry mapping information corresponds to a plurality of application data disk block addresses;
   a database mapping catalog, the database mapping catalog comprises a database table, wherein the database table corresponds to a logical file-system address; and
   a file-system logical block address, wherein file-system data is allocated on a storage controller and the file-system logical block address is mapped to the storage controller logical block address.

9. The method of claim 6, wherein the update operation is discovered from an application transaction log.

10. The method of claim 6, wherein the update operation is selected from at least one of a delete operation, an insert operation, and an update operation.

11. A computer program product for automatically detecting inadvertent writes to data to restore, the computer program product comprising:
    a non-transitory computer readable storage medium having computer readable program code stored therein, the computer readable program code comprising:
    computer readable program code configured to manage a snapshot schedule for creating and storing snapshots of available volumes of data and for periodically storing bitmaps of said snapshots;
    computer readable program code configured to receive a query specifying a corrupt application data set, said set comprising data information about at least one corrupt data object and time information temporally locating said corrupt data object;
    computer readable program code configured to locate one or more bitmaps for snapshots for said at least one corrupt data object, said one or more bitmaps having at least one bitmap entry indicating whether data previously stored at a corresponding storage location has been modified;
    computer readable program code configured to locate a transaction log for said at least one corrupt data object based on said time information, said transaction log having at least one transaction log entry;
    computer readable program code configured to compare at least one transaction log entry to said at least one bitmap entry for said one or more bitmaps; and
    computer readable program code configured to detect an inadvertent write when a change to a bitmap entry does not have a corresponding transaction log entry,
    wherein detecting an inadvertent write comprises detecting a snapshot anomaly pattern, the snapshot anomaly pattern existing in a snapshot storage region when there is a probability of change to a database table and no update operation for the snapshot.

12. The computer program product of claim 11 further comprising computer readable program code configured to identify a non-corrupt snapshot created and stored before the detected inadvertent write.

13. The computer program product of claim 12 further comprising computer readable program code configured to use said non-corrupt snapshot to restore the data.

14. The computer program product of claim 11 wherein said computer readable program code configured to locate one or more bitmaps comprises:
    computer readable program code configured to identify a file system location for said at least one corrupt data object based on query information;
    computer readable program code configured to map the file system location to at least one volume logical block;
    computer readable program code configured to locate at least one snapshot of said at least one volume logical block; and computer readable program code configured to retrieve at least one snapshot volume bitmap for said at least one snapshot.

15. The computer program product of claim 11 further comprising computer readable program code configured to receive metadata for each snapshot and analyze the metadata of each snapshot, wherein analyzing the metadata comprises discovering an update operation related to a database table and associated with a transaction and discovering a change to a subset of a plurality of blocks of the database table.

16. The computer program product of claim 11 further comprising computer readable program code configured to identify a non-corrupt snapshot of the data, wherein the non-corrupt snapshot of the data exists if the snapshot storage region corresponds to a region occupied by a database object to restore.

17. A computer system having at least one processor for identifying inadvertent changes to application data comprising:
   at least one storage device;
   a file system volume manager for creating snapshots of available volumes of application data and for periodically creating snapshot volume bitmaps of said snapshots, said bitmaps having bits to represent changes to data in said available volumes;
   a storage controller for storing snapshots of available volumes of application data and snapshot volume bitmaps in said at least one storage device;
   a transaction log manager for logging transaction log entries of authorized changes to application data; and
   a recovery processing system for identifying unauthorized changes to application data based on comparison of said snapshot volume bitmaps to transaction log entries, detecting an unauthorized change when a change to a bitmap entry does not have a corresponding transaction log entry,
   wherein said detecting an unauthorized change comprises detecting a snapshot anomaly pattern, the snapshot anomaly pattern existing in a snapshot storage region when there is a probability of change to a database table and no update operation for the snapshot; and
   at least one data processing apparatus for executing the file system volume manager, the storage controller, the transaction log manager, and the recovery processing system.

18. The system of claim 17 wherein the recovery processing system further identifies a non-corrupt snapshot created before said identified unauthorized change.

* * * * *